Patented Feb. 8, 1944

2,341,110

UNITED STATES PATENT OFFICE 2,341,110

PROCESS FOR THE MANUFACTURE OF KETOSTEROIDS

Luigi Mamoli, Milan, Italy, assignor to Schering Corporation, Bloomfield, N. J., a corporation of New Jersey No Drawing. Application April 17, 1940, Serial No. 330,061. In Czechoslovakia May 12, 1939

4 Claims. (Cl. 195—30)

This invention relates to the biochemical production of ketosteroids and is an improvement over the process of U. S. application Serial No. 210,778, which has issued as Patent No. 2,236,574, dated April 1, 1941.

In the above mentioned copending application a process is described according to which steroids containing a hydroxy group capable of being dehydrogenated, are transformed into ketones by phytochemical means and thereafter are subjected, if desired, to a complete or partial biochemical hydrogenation.

According to the process of said application, among others, dehydroandrosterone, pregnenolone and methylandrostendiole are dehydrogenated by means of a mixture of bacteria obtained from Milanese yeast whereby androstendione, progesterone, or methyltestosterone respectively are formed of these compounds and the products so obtained, or certain of them, subjected, if desired, to the action of hydrogenating agents to effect partial hydrogenation whereby, for instance, androstendione is converted into testosterone.

Now I have found that the process of biochemical dehydrogenation on the types of substances disclosed in the above named patent and for the production of the same end products, is carried out in a very good manner by employing a pure strain of bacteria as it is isolated from the mixture of bacteria mentioned above. This pure strain is obtained, for example, according to the following procedure:

A dehydrogenating mixture of bacteria is obtained from Milanese yeast, for instance, according to Mamoli and Vercellone, Berichte der deutschen chemischen Gesellschaft (1938) vol. 71, page 1686. In this mixture the form of small rods predominates. On cultivating them by means of plate cultures on yeast water-agar at the optimal temperature of 37° C. not only large white superficial colonies, showing curl-like branches, are observed but also numerous smaller, lemon-colored, elevated, smooth-edged succulent bright colonies are present having a diameter up to 2 mm. The pure cultures obtained from said yellow colonies on yeast water are capable of dehydrogenation, while the large white colonies contain spore-forming bacteria of the type of bacillus subtilis, being uncapable of dehydrogenation.

The bacilli obtained from the yellow colonies on microscopic examination represent small rods which are partly joined to short threads. Formation of spores and motility could not be observed. The physiological properties of the bacilli indicate that said organisms most probably belong to the strain of Bacterium Coryne, which according to its origin may be called Bacterium Coryne mediolanum. The strain is capable of being stained according to Gram. Though formation of longer threads, true ramification, claviform dilations and the like could not be observed, shorter threads, however, and certain irregularities in shape were evident. Also the formation of stripes on staining, whereby good and bad staining parties alternate, was observed several times. The strain shows good growth on yeast water and on the corresponding agar or gelatine culture media. Less favorably proves a medium of peptone-bouillon prepared from meat extract. It is very remarkable that said bacteria have a very pronounced requirement for air and that they possess a strong power of peptonizing milk, which is coagulated at 37° C. to a solid mass within 3 days. Later on the coagulum is dissolved, beginning from the surface and within about 14 days the mass is transformed practically completely into a yellowish fluid. Cultivated on gelatine-stab-culture media the bacteria show only a moderate growth in the channel formed by stabbing, while on the surface a yellow film is formed. The liquefaction of gelatine begins at room temperature after about 6-7 days and proceeds slowly. Shaking-cultures of peptone-bouillon-agar containing 2% of glucose or lactose show good growth on the surface, but no formation of gas. When cultivated on yeast antolysates vary in the beginning a little or no growth at all is observed. Cultures on potatoes show like slant-cultures on agar a solid, yellow, succulent, bright film.

All these properties agree with a strain belonging to the family of Bacterium Coryne, especially with Bacterium Coryne helvolum L et N (also known as Flavobacterium helvolum—see Bergey's "Manual of Determinative Bacteriology," 5th edition, 1939, pages 544-545); thus, in the place of a strain obtained from Milanese yeast, also strains of Bacterium Coryne cultivated in another manner as described above may be employed.

The dehydrogenation of hydroxy steroids by means of the strain of bacterium described above is performed in the same manner as described in the examples of the copending application Serial No. 210,778, for example by causing the bacteria to act on androstendiol, dehydroandrosterone, androstendiol monopropionate-17, cholesterol, etc., in the presence of air. Where an additional oxidizable hydroxyl group is present in the starting compound which is to be protected against oxidation, it is converted into a group resistant to oxidation and capable of re-conversion into a hydroxyl group, as for example an ester, ether or halogen group. My improved process is illustrated by way of example in the following:

*Example*

60 cc. of sterile yeast water are buffered by addition of 10 cc. of M/5 solution of secondary sodium phosphate and 10 cc. of M/5 solution of primary potassium phosphate and after addition of 200 mgs. of finely pulverized 21-acetoxy-pregnenol-3-one-20 the mixture is sterilized for 1 hour in a steam vessel. After cooling some drops of a fresh culture of Bacterium Coryne, obtained by cultivation and having the above described properties, in yeast water is added. This mixture is shaken for 6 days at 36-37° C. under oxygen. Then the mixture is filtered, the residue dissolved in acetone, the acetonic solution freed from bacteria by filtration, and then the acetone is removed by evaporation. The remainder is carefully recrystallized from diluted acetone. The first crystallisation consists of 54 mgs. of the starting material. The mother liquor is brought to dryness, the remainder dissolved in acetone and the acetonic solution is mixed with ether. The crystals formed consist of desoxy-corticosterone of M. P. 139-140° C. Yield 60 mgs.

What I claim is:

1. A process for the manufacture of ketosteroids, comprising subjecting a steroid containing an alcoholic hydroxy group capable of dehydrogenation to the action of Bacterium *Coryne mediolanum* until the alcoholic group is converted into a keto group.

2. Process according to claim 1, wherein the steroid is 21-acyloxy-pregnenol-3-one-20.

3. Process according to claim 1, wherein the steroid is dehydro-androsterone.

4. Process according to claim 1, wherein additional oxidizable hydroxyl groups which are to remain unoxidized are protected against oxidation by conversion into a group which can be reconverted into a hydroxyl group with the aid of hydrolysis.

LUIGI MAMOLI.